Figure 1:
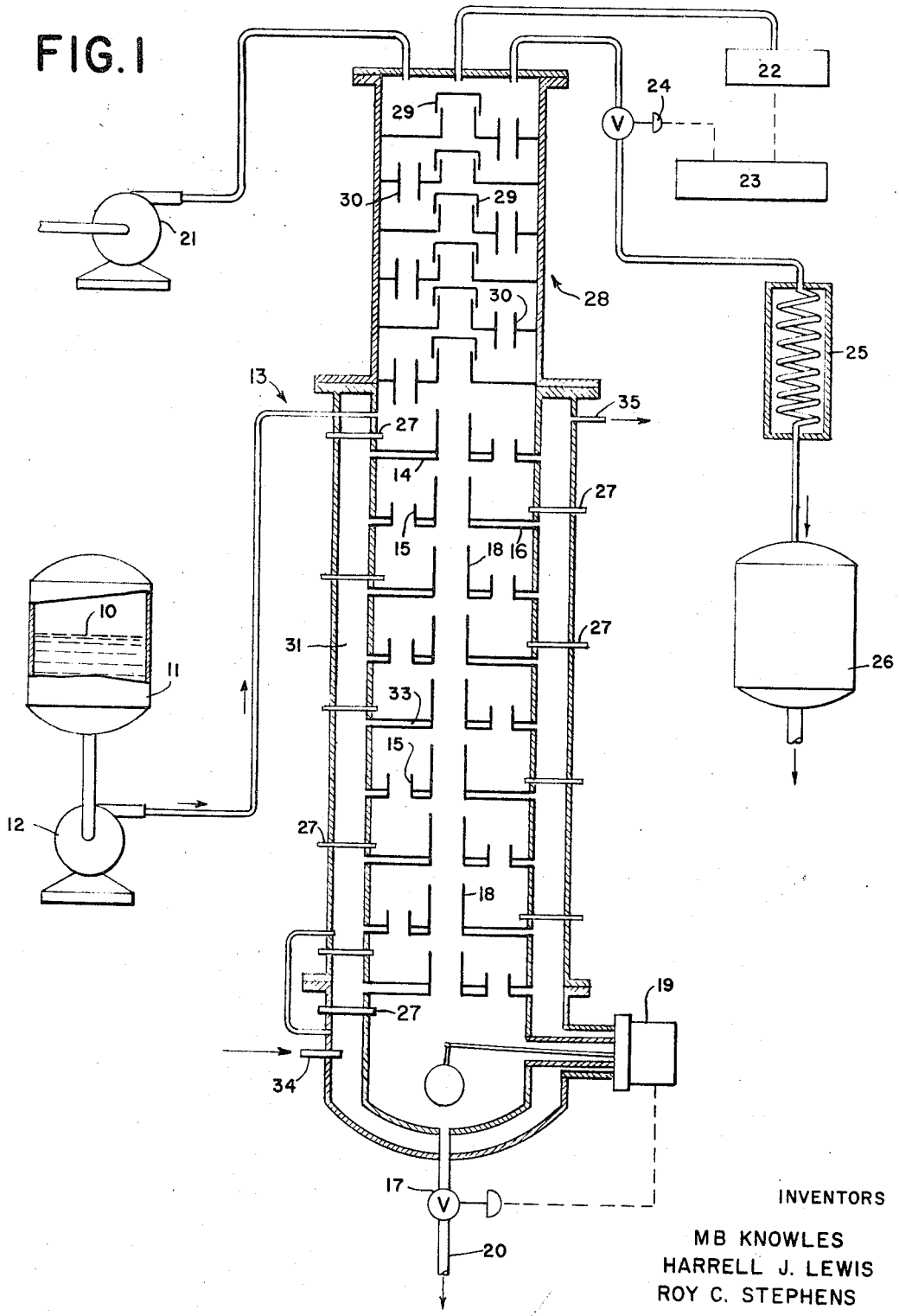
Figure 2:
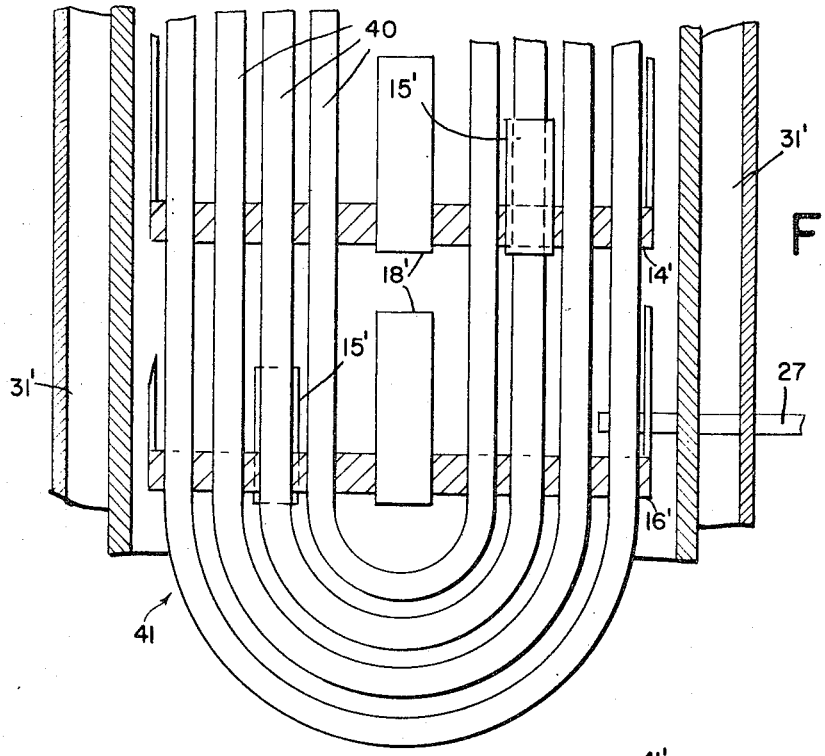
Figure 3:
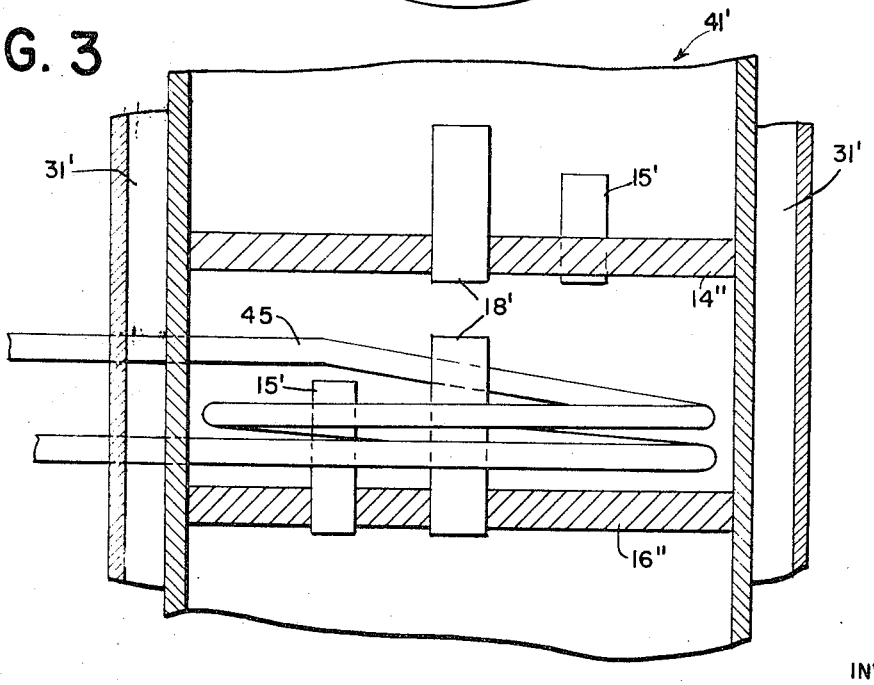

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 23, 1970

875 O.G. 384

T875,023

CONTINUOUS MELT PHASE MANUFACTURE OF LOW MOLECULAR WEIGHT POLYAMIDES

M B Knowles, Harrell Julian Lewis, and Roy Clifford Stephens, all of P.O. Box 511, Kingsport, Tenn. 37662

Continuation of application Ser. No. 685,734, Nov. 16, 1967. This application Dec. 12, 1969, Ser. No. 880,506

Int. Cl. C08g *20/20*

U.S. Cl. 260—78

2 Sheets Drawing. 18 Pages Specification

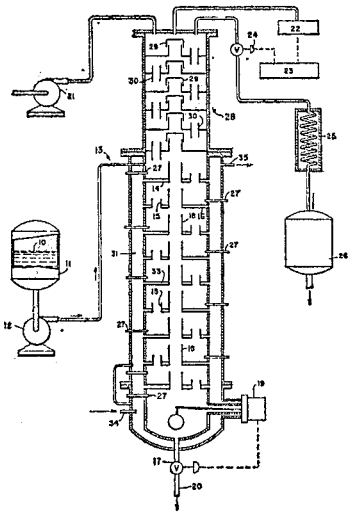

Water-free, low molecular weight polyamides may be prepared from aqueous solutions of polyamide salts under superatmospheric pressure by passing a solution of a polyamide salt through a plurality of heated zones at a superatmospheric pressure while under essentially plug-flow conditions, the zones being heated to a temperature sufficient to eliminate water in vapor form from the resulting low molecular weight polyamide, and the zones providing a decreasing ratio of heating surface to volume of material being treated in the direction of flow, and withdrawing a substantially water-free low molecular weight polyamide from the last of the zones at a pressure below that of the said last zone.

June 23, 1970 M. B. KNOWLES ET AL T875,023

CONTINUOUS MELT PHASE MANUFACTURE OF LOW MOLECULAR WEIGHT POLYAMIDES

Original Filed Nov. 16, 1967 2 Sheets-Sheet 1

INVENTORS

MB KNOWLES
HARRELL J. LEWIS
ROY C. STEPHENS

BY William T. French
Thomas A. Hoge
ATTORNEYS

INVENTORS
MB KNOWLES
HARRELL J. LEWIS
ROY C. STEPHENS
BY William T. French
Thomas A. Hodge
ATTORNEYS